Aug. 21, 1951     H. A. TAYLOR     2,565,101

DRILLING APPARATUS

Filed June 17, 1949     5 Sheets-Sheet 1

INVENTOR.
HOWARD A. TAYLOR
BY HIS ATTORNEYS.
HARRIS, KIECH, FOSTER & HARRIS

Aug. 21, 1951 H. A. TAYLOR 2,565,101
DRILLING APPARATUS
Filed June 17, 1949 5 Sheets-Sheet 2

INVENTOR.
HOWARD A. TAYLOR
BY HIS ATTORNEYS.
HARRIS, KIECH, FOSTER & HARRIS

Aug. 21, 1951       H. A. TAYLOR       2,565,101
              DRILLING APPARATUS
Filed June 17, 1949                5 Sheets-Sheet 3

INVENTOR.
HOWARD A. TAYLOR
BY HIS ATTORNEYS.
HARRIS, KIECH, FOSTER & HARRIS
BY
Clarence F. Kiech

Aug. 21, 1951     H. A. TAYLOR     2,565,101
DRILLING APPARATUS

Filed June 17, 1949     5 Sheets-Sheet 4

INVENTOR.
HOWARD A. TAYLOR
BY HIS ATTORNEYS.
HARRIS, KIECH, FOSTER & HARRIS
BY Clarence F. Kiech Aug. 21, 1951 H. A. TAYLOR 2,565,101
DRILLING APPARATUS
Filed June 17, 1949 5 Sheets-Sheet 5

INVENTOR.
HOWARD A. TAYLOR
BY HIS ATTORNEYS.
HARRIS, KIECH, FOSTER & HARRIS
BY

Patented Aug. 21, 1951

2,565,101

UNITED STATES PATENT OFFICE 2,565,101

DRILLING APPARATUS

Howard A. Taylor, Temecula, Calif., assignor of one-half to Manley L. Natland, Lomita, and one-half to Lester Callahan, Long Beach, Calif.

Application June 17, 1949, Serial No. 99,718

16 Claims. (Cl. 255—1.4)

My invention relates to a drilling apparatus particularly suited for drilling wells while making it possible periodically to obtain cores from the drilled strata without removing the drilling equipment from the well.

In my prior application Serial No. 705,691, filed October 25, 1946, now Patent No. 2,520,517, I have disclosed a drilling structure adapted to drill in an annular zone to leave a central core portion which rises in a tubular member as drilling progresses. Bending forces are applied to the upper end of the core portion to subdivide same into core sections or core masses which are discharged into the mud stream. When such a bit is pulled for inspection, repair or replacement, there is carried upward a length of the core portion, contained in the tubular member, which gives valuable geological data as to the recently-drilled strata.

In the prior structure, considerable savings are effected as compared with the use of a conventional core bit which is lowered for a relatively short drilling period, particularly as excursions into and from the well are costly and time-consuming in requiring coupling and uncoupling of a multitude of stands of drill pipe. The apparatus of my prior application makes it possible to obtain a core each time the bit is pulled but it is sometimes desirable to take cores more frequently, particularly when penetrating critical formations.

It is an object of the present invention to provide an apparatus whereby a core can be taken at any time during the drilling operation and without removing the bit from the well.

Another object of the invention is to provide a coring structure adapted to drive a bit capable of producing a central core portion and being equipped with a removable core-receiving or core-withdrawing unit connectible to a sand line or other lifting element lowered through the drill string.

It is of particular advantage to employ a core-withdrawing unit equipped with a sidewardly-facing window communicating with a sidewardly-facing window of the tubular drive unit, these windows receiving and discharging into the rising mud stream the subdivided core portion. With such an arrangement, and if the core-withdrawing unit is to be withdrawable from the tubular drive unit, I have found it necessary to provide means for orienting the relative angular positions of the units to bring such windows into registry or alignment. It is an important object of the present invention to provide a structure with such an orienting means.

Another object of the invention is to provide such a structure in which the core-withdrawing unit is automatically turned angularly during lowering into the tubular drive unit to insure that such windows will be in registry or alignment.

It is usually the practice to force downwardly through the drill string a dense drilling mud under high pressure, this mud discharging through passages of the bit and rising in the annular space within the well around the drill string. It is an object of the present invention to prevent the drilling mud from being by-passed from the interior of the drill string through the aligned windows or either of them. The invention contemplates various types of sealing means for this purpose.

Another object of the invention is to effect such a sealing action between the tubular drive unit and the core-withdrawing unit in such way that these units can be separated and reassembled at a remote point while insuring satisfactory operation of the sealing means.

It is a further object of the invention to flow the drilling mud downwardly below the window zone and with a minimum of impedance to such flow.

Further objects and advantages of the invention will be evident to those skilled in the art from the following description of exemplary embodiments.

Referring to the drawings:

Fig. 7 is a longitudinal sectional view of the upper portion of an alternative embodiment of the invention, while Fig. 8 is a similar sectional view of the lower portion thereof with a shift in planes as described with reference to Fig. 2;

Fig. 9 is a transverse sectional view taken on the line 9—9 of Fig. 7;

Fig. 10 is a fragmentary sectional view, partly in elevation, taken approximately along the line 10—10 of Fig. 7;

Figures 1, 2:
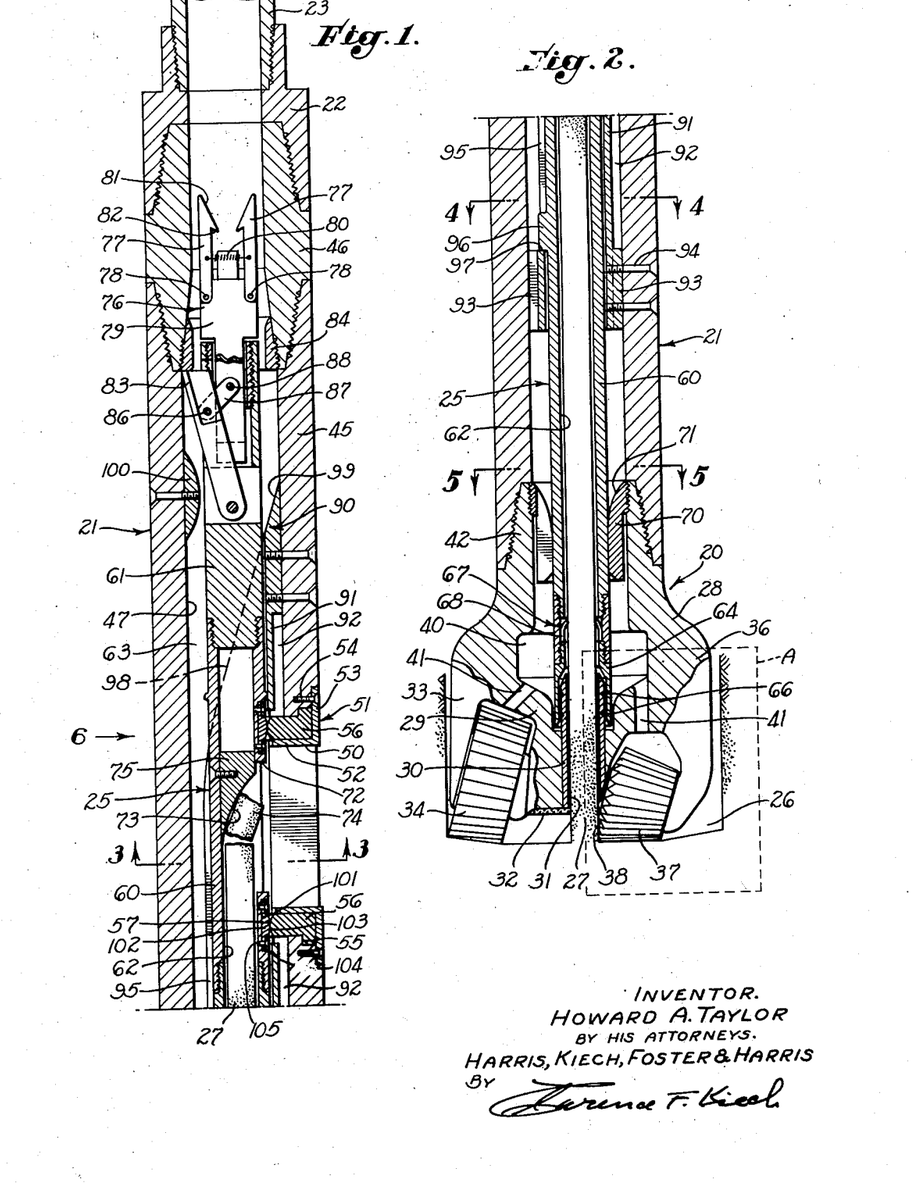
Fig. 1 is a longitudinal sectional view of the upper portion of one embodiment of the invention.
Fig. 2 is a similar longitudinal sectional view of the lower portion of this embodiment of the invention, the portion within the dotted rectangle A being actually a sectional view in a plane transverse to the paper but being swung into the plane of the paper.

Referring particularly to Figs. 1 and 2, the invention employs a bit 20 connected to a tubular drive unit 21. The tubular drive unit 21 is connected by any suitable means, such as a collar 22, to the lower end of a drill string 23 comprising the usual drill column which can be uncoupled in sections and which is connected to the usual rotary table to drive the bit. The invention is characterized by the use of a removable core-receiving or core-withdrawing unit generally indicated by the numeral 25.

More specifically, the bit 20 is of the type adapted to drill into the earth in an annular zone 26, to leave an upstanding core portion 27. While various types of bits can be employed, the one illustrated in Fig. 2 includes a massive bit body 28 having a depending head 29 centrally apertured to retain a sleeve 30 providing a central passage 31 in which the core portion 27 may rise as drilling progresses. The sleeve 30 may be welded in place by hard-weld or abrasive-resisting material 32 applied to the lower flat face portions of the depending head 29.

The bit body 28 provides diametrically opposed depending arms 33 and two diametrically opposite rotary gage cutters 34 are pivoted on conventional pins extending from such depending arms to lower portions of the depending head 29. In a plane at right angles to the paper, the bit body 28 also provides diametrically opposed depending arms 36 carrying stub-like pins which journal diametrically opposed mill cutters 37. In the bit exemplified in Fig. 2, the gage cutters 34 and the mill cutters 37 cut into the earth in outer and inner portions of the annular zone 26, the mill cutters 37 each providing a toothed frustro-conical portion 38 which sizes the core portion 27 and insures that this core portion shall be of slightly smaller diameter than the central passage 31.

The bit body 28 provides an annular mud chamber 40 from which mud is jetted through orifices 41 to the zone of rotation of the cutters 34 and 37. The upper end of the bit body carries an externally threaded pin 42 for detachable connection to the lower end of the tubular drive unit 21.

The tubular drive unit 21 may comprise a massive drill collar or sub 45 connected to the collar 22 by a nipple 46 which is threadedly received in cavities of the drill collar 45 and the collar 22. The tubular drive unit provides a longitudinal passage 47 which removably receives the core-withdrawing unit 25.

The tubular drive unit 21 or its component drill collar 45 provides a side portion in which is formed a sidewardly-directed window 50. In the embodiment of Figs. 1-6, the window 50 is bounded by a frame member 51 which includes a window-bounding flange 52 and a peripheral flange 53 which is countersunk into the outer periphery of the drive unit 21 and held in place by any suitable means such as screws 54. Around the window 50, the drive unit 21 provides a shoulder 55 against which is clamped by the frame member 51 a compressible sealing member 56 which completely surrounds the window 50 and projects into the longitudinal passage 47 to provide a sealing surface 57 for a purpose to be described.

Adapted to be lowered into the tubular drive unit 21 and to be removably locked therein is the core-receiving or core-withdrawing unit 25. This unit is shown as having a lower end terminating adjacent the bit 20 and an upper end terminating adjacent the upper end of the drill collar 45. The core-withdrawing unit 25 includes a tubular member 60 the upper end of which is preferably closed by a head member 61. It also provides a core passage 62 aligned with the central passage 31 and in which the core portion 27 may rise as drilling progresses. The external diameter of the core-withdrawing unit 25 and its tubular member 60 is materially less than the internal diameter of the longitudinal passage 47 to provide therebetween an annular mud-conducting space 63 which conducts a dense drilling mud from the interior of the drill string 23 to the mud chamber 40 of the bit.

It is desirable that the lower end of the tubular member 60 telescope with the upper end of the sleeve 30 to insure alignment and to maintain a fluid-tight junction therewith to prevent entry of high pressure drilling mud into the lower portion of the core passage 62. In Fig. 2 the lower end of the tubular member 60 is shown as including a skirt member 64 which has a lower beveled edge which can slide over and be guided by an upper beveled edge of the sleeve 30 to telescope with this sleeve and assume the relative position shown in Fig. 2. The junction or telescoping joint may be effectively sealed against passage of mud by a pair of rubber O-rings 66 which may be carried either by the skirt member 64 or the sleeve 30. In some instances, the lower end of the tubular member 60 or the skirt member 64 may engage a portion of the bit to act as a stop means and determine the lowermost position of the core-withdrawing unit 25. However, I prefer to provide other stop means serving this function, as will be described.

The lower end of the tubular member 60 preferably carries a core catcher which may be of conventional form to provide spring fingers 68 which assist in lifting and/or severing the core portion disposed in the core passage 62 when the drilling structure is pulled for the purpose of inspection or replacement of the bit.

Figure 5:
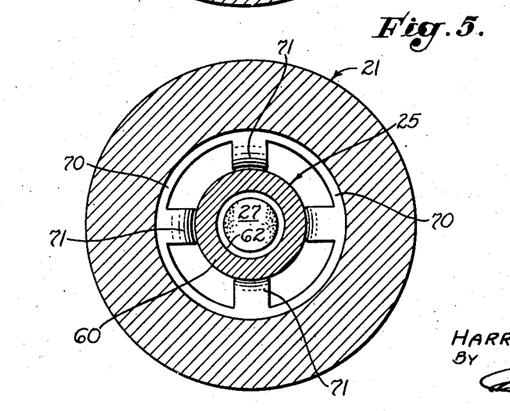

As the tubular member 60 is lowered, the beveled faces of the sleeve 30 and skirt member 64 guide the lower end of the tubular member into correct centered position. Usually, however, I prefer to provide other centering means for the tubular member and Figs. 2 and 5 show a spider-like centering member 70 threadedly received by the pin 42 of the bit 20 and providing four arms with downwardly converging surfaces 71 which guide the lower end of the tubular member into central position during its lowering. The space between such arms is available to conduct the drilling mud downwardly to the bit.

Near its upper end, the tubular member 60 provides a side portion in which is cut a sidewardly-facing window 72 which is adapted to register with the window 50 of the tubular drive unit 21. Adjacent the window 72, the tubular member provides a sloping surface which contacts the upper end of the core portion 27 and applies sidewise or bending forces thereto. This subdivides the upper end of the core portion 27 by breaking therefrom sizable core sections 74 or otherwise crushing or abrading such upper end to maximize the length of the core portion 27. The gyrations of the sloping surface 73 or its curvature exerts such subdividing forces on the upper end of the core portion 27 to subdivide the core portion into core masses which may be of a size depending upon the type of formation, the natural cleavage planes of the core portion, etc. However, the sloping surface 73 faces the window 72 and deflects such core masses outwardly through this window and through the aligned window 50 to discharge into the mud stream which rises in the annular space within the well or casing and around the tubular drive unit 21 and the drill string 23. The core masses are thus carried continuously to the surface of the ground with the rising mud stream from which they may be separated to give valuable geological data as to strata recently penetrated.

The sloping surface 73 may be an integral part of the tubular member 60 or may be provided by a separate closure member 75 as suggested in Fig. 1. This closure member is shown as fixed within the tubular member 60.

The invention contemplates a means for lifting the core-withdrawing unit 25 from the tubular drive unit 21 and from the well at any time that a relatively long core section is desired. In this connection, a sand line or other lifting element can be lowered through the drill string to lock with an engaging means 76 of the upper end of the core-withdrawing unit 25 so that this unit can be bodily lifted from the tubular drive unit to withdraw a relatively long core section currently occupying the core passage 62. The core-withdrawing unit 25 is then again lowered through the drill string and assumes its position shown in Figs. 1 and 2.

The engaging means 76 is shown in rather conventional form as including latches 77 pivoted at 78 to a plunger member 79 and resiliently held in inward position by a spring 80. These latches provide sloping surfaces 81 terminating in hooks 82. A tapered head member, not shown, and connected to the lower end of the sand line or other lifting element, is lowered to spread the latches 77 which then spring inwardly to lock a portion of the tapered head member below the hooks 82. Upward movement of the sand line will lift the plunger member 79 relative to the head member 61 of the core-withdrawing unit 25. The first portion of this movement will swing inwardly a latch 83 previously seating below a shoulder of a ring 84 carried by the nipple 46. The latch 83 is pivoted to the head member 61 on a pin 85 which traverses a slot receiving the lower end of the latch 83. Near its upper end, the latch 83 is pivoted at 86 to a lever 87 which is pivoted to a pin 88 secured to the plunger member 79. As the plunger moves upwardly, the distance between the pins 85 and 88 increases to swing the latch 83 inwardly and into released position, whereupon further upward movement of the plunger member 79 will lift the entire core-withdrawing unit 25 by forces transmitted through the lever 87 and the latch 83.

The core-withdrawing unit 25 may be subsequently lowered on the sand line or lifting element, a go-devil being dropped to spread the latches 77 to release the aforesaid tapered member. Alternatively, and preferably, however, the core-withdrawing unit is merely dropped through the drill string to settle through the mud and into the tubular drive unit 21. If the dropping velocity is not sufficient to seat the latch 83, starting the flow of drilling mud will cause the core-withdrawing unit 25 to be moved downward into seating position and will force the plunger member 79 downwardly to move the latch 83 into its locking position.

It is important to the invention that the core-withdrawing unit should be angularly oriented relative to the tubular drive unit during such lowering of the former into the latter so as to bring the windows 72 and 50 into registry and radial alignment. To accomplish this, the invention employs a suitable guide means, indicated generally by the numeral 90 comprising interengaging means on the tubular drive unit and the core-withdrawing unit to orient the latter relative to the former. Generally speaking, the interengaging means includes interengageable guide elements, respectively on the two units and preferably comprising a cam means on one of the units and a cam follower means on the other of the units.

Figure 6:
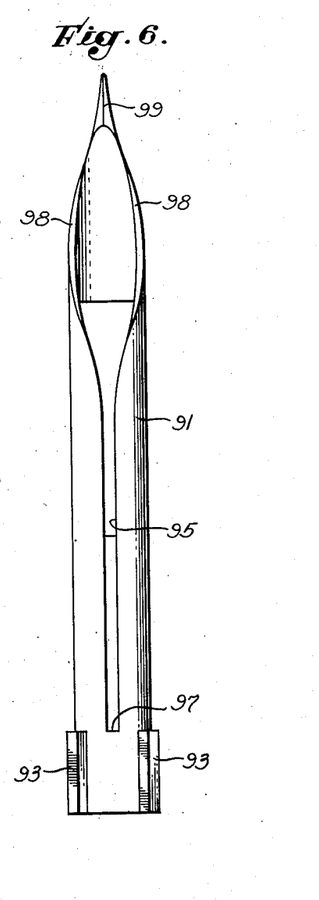
Fig. 6 is a perspective view of the inner member of the invention, shown partially in Figs. 1 and 2, as viewed in the direction of arrow 6 of Fig. 1.

In the embodiment of Figs. 1–6, cam means is associated with the tubular drive unit and is provided by an inner member 91 of a shape best shown in Fig. 6. This inner member may be considered as a tube of smaller diameter than the tubular drive unit to provide an annular space 92 therebetween. At its extreme lower end, the inner member provides bosses 93 which traverse the annular space 92 and serve to center the inner member relative to the tubular drive unit. The inner member may be secured to the tubular drive unit adjacent the bosses 93, either by welding or by screws 94. The space between the bosses comprises a passage means for the mud stream.

The inner member 91 provides a longitudinal slot 95 in that side opposite the window 72. The tubular member 60 carries a massive boss or cam follower 96 (Fig. 2) which slides downwardly in the longitudinal slot 95 until it engages a closed end 97 of the slot which acts as a stop means determining the lowermost position of the core-withdrawing unit 25. When the cam follower 96 is within the longitudinal slot 95, the window 72 is correctly angularly oriented relative to the window 50.

To swing the cam follower 96 and its connected core-withdrawing unit into correct orientation relative to the longitudinal slot 95 during lowering of the core-withdrawing unit, the upper end of the inner member 91 provides a pair of upwardly-exposed substantially helical cam surfaces 98 which feed smoothly into the longitudinal slot 95 and which converge, at the upper end of the inner member, to a point or edge 99 which may be radial or sloping as shown. The edge 99, should it be contacted by the cam follower 96, turns the core-withdrawing unit 25 to engage one or the other of the helical cam surfaces 98, the latter being relatively steep to guide the cam follower around the vertical axis and turn the core-withdrawing unit during its lowering until the windows 72 and 50 are in correct angular alignment. Alignment of the windows in a direction axially of the tubular drive unit is insured by seating of the cam follower 96 against the closed end 97 of the longitudinal slot 95.

It is very desirable that the guide means, here formed by the cam surfaces 98 and the follower 99, should be disposed to engage at a position above the window 50. It is also desirable that the lower end of the core-withdrawing unit shall enter some centering means before being turned by the cam means into correct orienting position. It is also desirable that the lower end of the core-withdrawing unit should be below the window 50 before engagement of the cam means. These relationships are insured if the axial distance between the lower end of the core-withdrawing unit and the window 72 is greater than the maximum axial distance between the window 50 and the most removed portion of the guide element or cam carried thereby. While it is possible to position the centering member 70 to receive the lower end of the core-withdrawing unit before engagement of the cam means, the inner member 91 of the embodiments of Figs. 1–6 acts as an initial centering means. It is not difficult to guide the lower end of the core-withdrawing unit into the inner member as the nipple 46 will approximately guide the unit. Additionally, however, it is often desirable to provide a minor projection 100 near the head member 61 which, with the sloping edge 99 will guide the lower end into the inner member 91.

Figure 3:
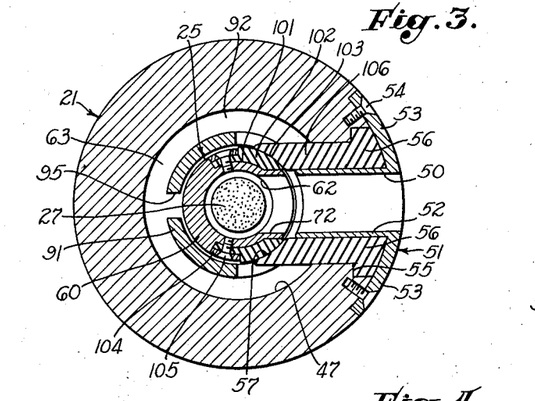
Fig. 3 is a transverse sectional view taken on the line 3—3 of Fig. 1.
Figure 4:
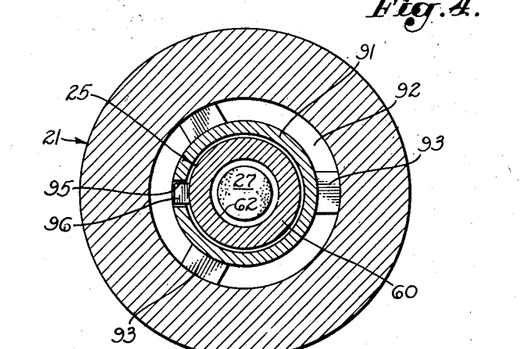
Figs. 4 and 5 are transverse sectional views respectively taken on the lines 4—4 and 5—5 of Fig. 2.

In all instances, it is desirable that the mud stream be sealed from the adjacent portions of the windows 50 and 72 to prevent escape of mud directly into these windows and into the rising mud stream. The sealing member 56, surrounding the window 50, may serve in this capacity, the sealing surface 57 directly engaging the periphery of the tubular member 60. However, Figs. 1 and 3 show an arrangement whereby an annular cavity 101 is formed in the outer periphery of the tubular member 60 to surround the window 72, this cavity receiving an annular sealing member 102 providing an outer sealing surface 103 adapted to engage the sealing surface 57 pressurally to effect a good seal. As best shown in Fig. 3, the sealing member 102 may be held in place by a frame 104 retained by screws 105. Alternatively, the sealing member 102 may be formed of rubber directly welded or permanently adhered to the tubular member 60. Also as shown in Fig. 3, the sealing member 56 desirably extends inwardly across the annular space 92, preferably providing longitudinal side members 106 formed of rubber or other flexible material and contoured to mate with the periphery of the sealing member 102. The mating surfaces slide relative to each other only during lowering of the core-withdrawing unit a distance equal to the window height. Additionally, when hydraulic mud pressure is built up in the annular space 92, it tends to force the side members 106 inwardly and into pressural contact with the sealing member 102, thus insuring a good seal.

Figures 7, 8, 9, 10:
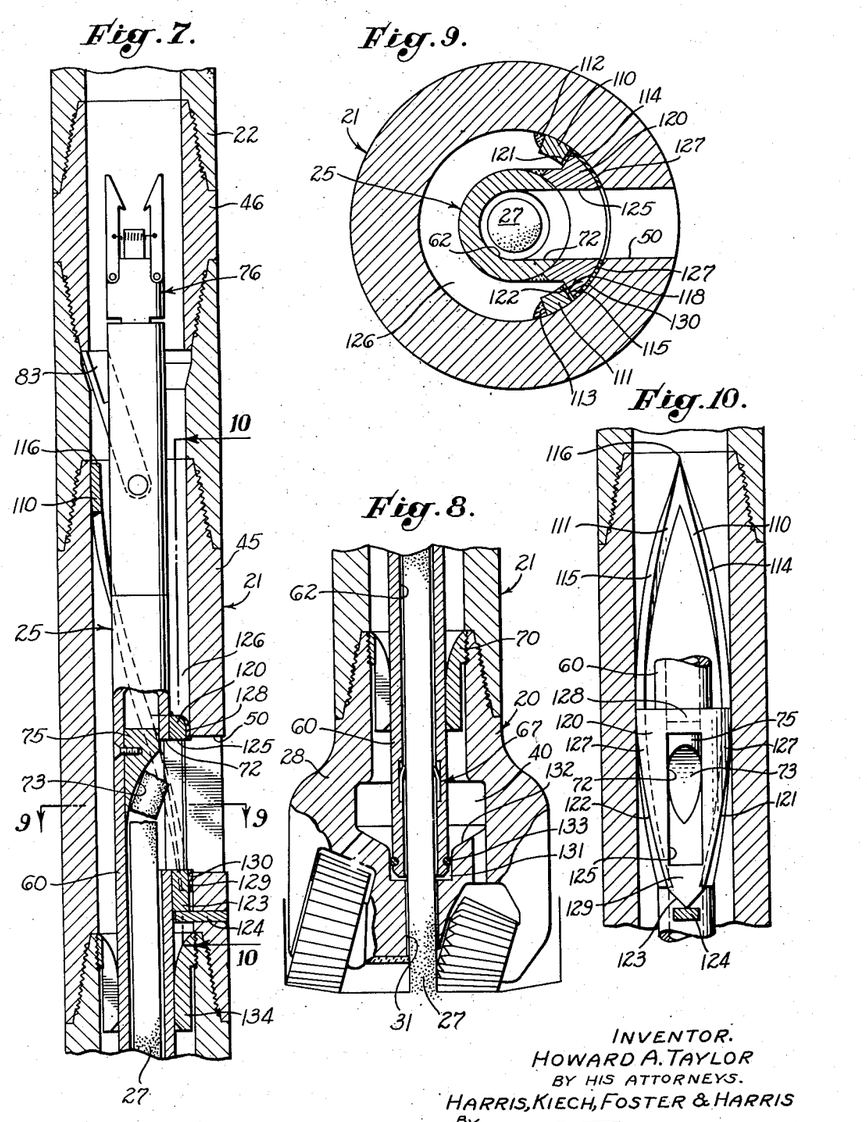

In the embodiment of the invention in Figs. 7–10, the tubular drive unit 21 is made sectional, as shown, to facilitate manufacture. Additionally, in an upper section thereof, the cam means is formed by an inner member welded to or integral with the tubular drive unit. This inner member is here formed of two helically-extending strips 110 and 111 respectively welded at 112 and 113 to the tubular drive unit. The strips 110 and 111 provide upwardly-exposed substantially helical cam surfaces 114 and 115 which meet at an upper edge 116 (Figs. 7 and 10).

In this embodiment, the cam surfaces 114 and 115 in effect diverge downwardly to their half-length points and then converge downwardly to form a ways or tapered socket, indicated in Fig. 9 by the numeral 118.

In the embodiment of Figs. 7–10, the core-withdrawing unit 25 carries a cam follower 120 having tapered cam surfaces 121 and 122 (Fig. 10) shaped helically to correspond to the lower portions of the cam surfaces 114 and 115. The arrangement is such that, in the absence of a stop means, the tapered cam surfaces 121 and 122 wedge against the cam surfaces 114 and 115 when the windows are in radial alignment. A tight wedging is not desired and to prevent this, the lowermost end of the cam follower 120 provides a pointed section 123 which seats against a stop member 124, welded in a slot of the tubular drive unit as shown in Fig. 7, just before wedging would take place. Some degree of wedging can be tolerated so long as the core-withdrawing unit can be lifted by the sand line. Interposing a jar in the sand line will facilitate unseating if there is any substantial wedging action.

The cam surfaces 114, 115, 121 and 122 are preferably not radial or are at least so formed that the cam follower 120 once it enters the tapered socket 118, cannot be removed therefrom by radial movement.

This type of guiding means or orienting means may be employed irrespective of the angular position of the window 72 in the tubular member 60 and, if desired, such window may be formed diametrically opposite the zone of the cam follower 120. However, I prefer to dispose this window 72 on the same side of the tubular member 60 as is the cam follower 120 and to provide a passage 125 through the cam follower 120 which interconnects and is in radial alignment with the windows 50 and 72, all as best shown in Figs. 7, 9 and 10. Correspondingly, the sloping surface 73 of the closure member 75 deflects the core masses through a sidewardly-facing passage means formed by the windows 72 and 50 and the passage 125.

With such an arrangement, it is desirable to seal from such passage means the high pressure mud in annular space 126 around the core-withdrawing unit 25 and within the tubular drive unit 21. In this connection, the cam follower 120 provides arcuate surfaces 127 on opposite sides of the passage 125 and arcuate surfaces 128 and 129 respectively above and below the passage 125, all of these arcuate surfaces being parallel to the inner cylindrical surface of the tubular drive unit. Such arcuate surfaces may be wedged tightly against and in surface contact with such inner cylindrical surface, if desired, to form a substantially mud-tight seal. However, the cam follower 120 will be less tightly wedged in the ways or tapered socket 118 if these arcuate surfaces are covered at least partially with a layer of sealing material 130, typically a somewhat deformable material permanently bonded to the metal arcuate surfaces. Such sealing means should completely surround the periphery of the passage 125 and will be pressed against the inner cylindrical surface of the tubular drive unit when the pointed section 123 engages the stop member 124.

The core-withdrawing unit 25 carries at its upper end an engaging means 76 as previously described and provides the same type of releasable latch 83, except that this latch is shown as seating beneath a shoulder provided directly by the nipple 46. As the core-withdrawing unit moves downwardly into the tubular drive unit 21, the cam follower 120 engages one or the other of the cam surfaces 114, 115, depending upon the angular orientation of the core-withdrawing unit at the time. Should this angular orientation be substantially 180° from that desired for window alignment, the pointed section 123 will contact the upper edge 116 of the cam means to start the turning of the core-withdrawing unit in one direction or the other. The core-withdrawing unit continues its downward movement until the cam follower is seated in the tapered socket 118, the seated position being determined by engagement of the pointed section 123 with the stop member 124. When it is desired to remove a core segment, drilling is stopped and a sand line or other lifting element is lowered and latched with the core-withdrawing unit to permit its withdrawal from the well, as previously described.

The lowermost end of the tubular member 60 is of slightly different configuration in this embodiment, as compared with the embodiment of Fig. 2. Referring to Fig. 8, this lower end, as before, drops into a socket 131 of the bit, being guided by sloping walls 132 and in this connection telescopes with a portion of the bit, albeit not with the sleeve 30 which is eliminated in this embodiment. The lower end of the tubular member 60 carries a sealing ring 133 which bears against the socket walls to seal the mud in the mud chamber 40 from the central passage 31 which is here formed by the bit body itself. Otherwise, the construction of the bit, shown in Fig. 8, is substantially the same as previously described.

However, in the currently-described embodiment, it is usually desirable to dispose a centering member 134, similar to the centering member 70 previously described, at a position only a short distance below the window zone. In Fig. 7, the centering member 134 is shown adjacent the threaded junction of two sections of the drill collar 45 forming a part of the tubular drive unit 21. The centering member 134 thus receives and centers the lower end of the tubular member 60 well before engagement between the cam follower 20 and the cam surfaces 114, 115.

In the embodiment of Figs. 11–14 a somewhat different guiding means and a different sealing means are employed for respectively orienting the core-withdrawing unit 25 and sealing the mud from the windows. In this embodiment, the cam surfaces are formed on an inner member 140, similar to the inner member 91, except that it is peripherally sized to fit snugly into the tubular drive unit 21. The upper portion of the inner member 140 provides upwardly-facing helical cam surfaces 141 and 142, meeting at an edge 143 and peripherally converging to a longitudinal slot 144 having a closed end 145 serving as a stop for a cam follower 146 of the core-withdrawing unit 25. An annular space 147 is formed within the upper portion of the inner member 140 around the core-withdrawing unit 25.

The lower portion of the inner member 140 is longitudinally grooved to provide mud-conducting passages 148 separated by arms 149 which maintain the inner member 140 centered. The passages 148 provide upper ends opening on the annular space 147 and lower ends discharging into an annular space 150, thereby conducting the mud past the window zone.

The lower portion of the inner member 140 forms a head member 151 which is bored to provide a passage 152 and counterbored to provide a socket 153 and a shoulder 154. The upper portion of the head member 151 provides a shoulder 155 which is preferably conical to guide the lower end of the tubular member 60 into the passage 152. The lowermost end of the tubular member 60 is of reduced diameter to slide through the passage 152 and provide a shoulder 156, the main portion of the tubular member 60 being of a size to be received in the socket 153. A sealing member 157, preferably an annular sealing ring, surrounds the reduced-diameter portion of the tubular member 60 and is compressed between the shoulders 154 and 156 when the cam follower 146 engages the closed end 145 of the slot 144. At this instant also, a sealing member 158, projecting from a collar 159 of the core-withdrawing unit 25, is pressed against the shoulder 155 in sealing relationship. The sealing members 157 and 158 are preferably formed of soft sealing material, such as rubber, to be pressed tightly against their respective shoulders. The function of these sealing members is to seal the mud above or below the head member 151 from entry around the tubular member 60 into the windows 72 and 50.

The head member 151 provides a passage 160, similar to the passage 125 of Fig. 7, which interconnects the two windows to form the sidewardly-directed passage means. The inner member 140 may be welded to the tubular drive unit 21 within this passage means, as indicated by the peripheral weld 161. The upper end of the inner member 140 may also be welded to the tubular drive unit or it may be secured thereto as by one or more screws 162. As before, the sloping surface 73 of the closure member 75 faces the windows, aligned by the guide or orienting means, and deflects the core masses outwardly into the rising mud stream.

Figure 11:
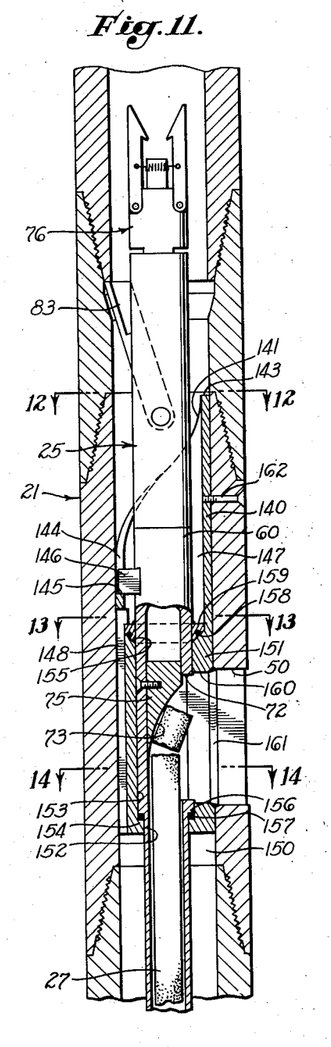
Fig. 11 is a longitudinal sectional view of another embodiment of the invention.
Figure 12:
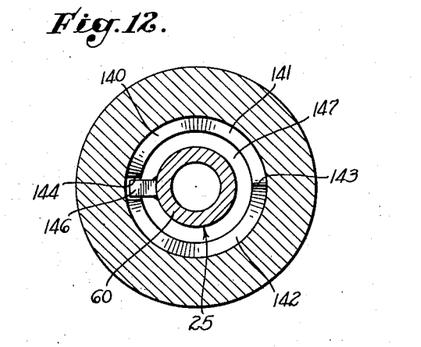
Figs. 12, 13 and 14 are transverse sectional views taken respectively along the lines 12—12, 13—13 and 14—14 of Fig. 11.
Figure 13:
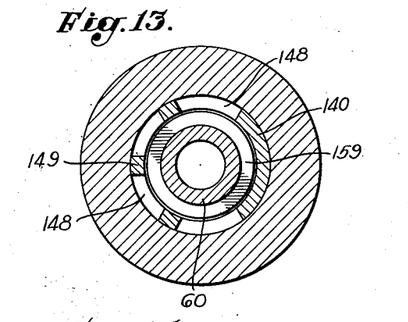
Figure 14:
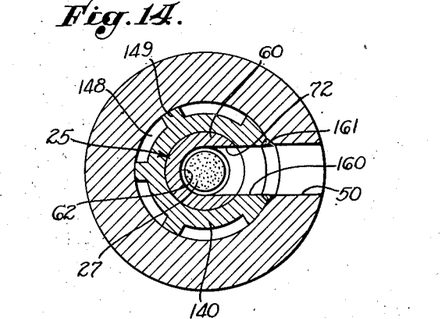

The lower end of the structure, below that shown in Fig. 11, may correspond to the structure shown in Figs. 2 or 8. The upper portion of the core-withdrawing unit 25 may correspond to the structure previously described concerning Figs. 1 and 7.

In this embodiment of the invention, the core-withdrawing unit will be angularly oriented, during the time it is lowered into the tubular drive unit, by engagement of the cam follower 146 with one or the other of the cam surfaces 141, 142. This will turn the core-withdrawing unit to bring the windows 50, 72 into axial alignment. Just before the cam follower 146 seats against the stop formed by the closed end 145, the sealing members 157 and 158 will respectively engage their shoulders so that the last increment of movement will compress these sealing members further to provide an effective mud seal.

In this and the other embodiments of the invention, the core-withdrawing unit is continuously forced downwardly against its stop by any mud stream moving downwardly in the drill string and in the tubular drive unit. This downward pressure on the core-withdrawing unit 25 ordinarily exceeds any upward pressure thereon from the core portion 27. However, the core-withdrawing unit is locked against upward movement by the latch 83 to prevent accidental upward displacement should the upward forces exceed the downward, mud-produced forces.

In the embodiment of Figs. 15–20 the drive unit 21 or its component drill collar 45 provides two windows 50 on opposite sides. The window 72 of the tubular member 60 can register with either of the windows 59. Correspondingly, the core-withdrawing unit 25 need only turn through a maximum angle of 90° to register the window 72 with one of the windows 59.

The interengaging or guide means for accomplishing this is shown as including an inner member 200 having upwardly facing cam surfaces 201 and 202 meeting at a crest 203 and opposed cam surfaces 204 and 205 meeting at a crest 206 (Fig. 17), the cam surfaces 202 and 205 peripherally converging to a slot 207 and the cam surfaces 201 and 204 converging to an opposed slot 208. These slots have closed ends serving as stops for a cam follower 210 comprising a heavy pin extending through the core-withdrawing unit 25, this pin being guided into the slots by the cam surfaces.

Figures 15, 16, 17, 18, 19, 20:
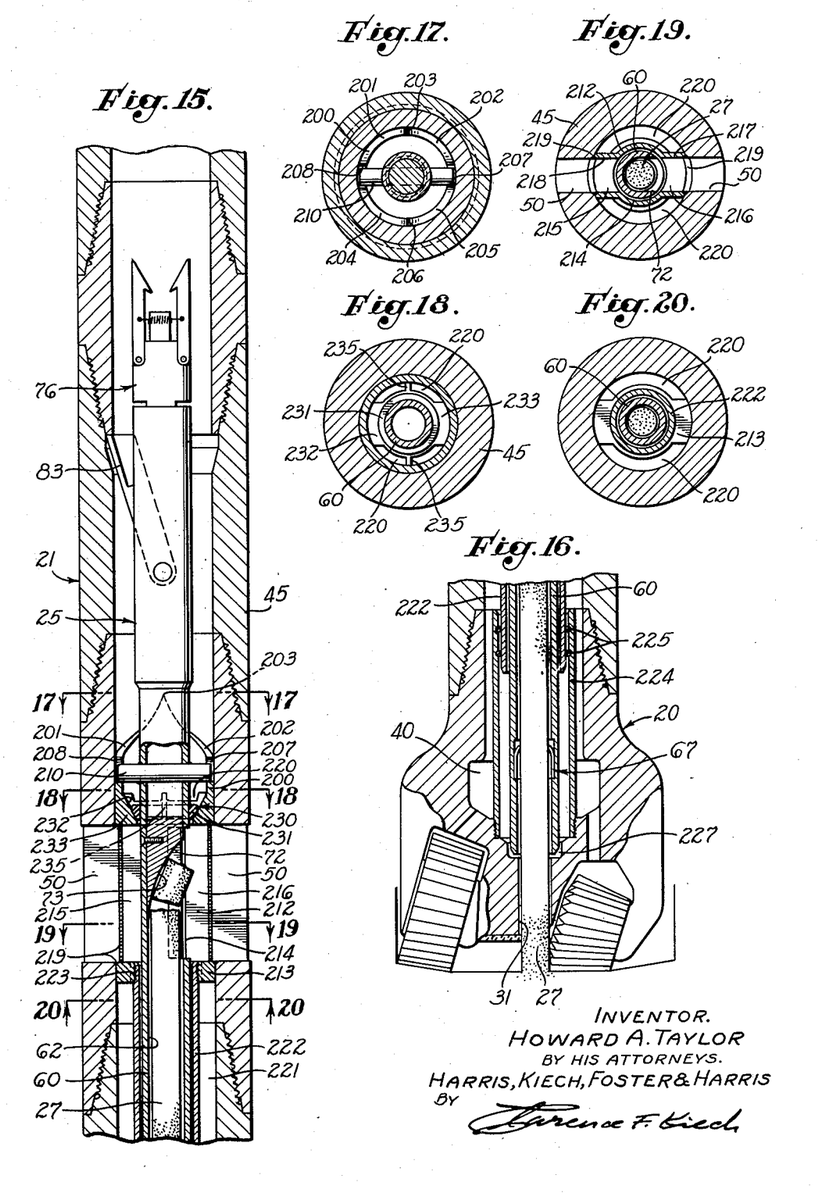
Figs. 15 and 16 are longitudinal sectional views of upper and lower portions of another embodiment of the invention.
Figs. 17-20, inclusive, are transverse sectional views taken along corresponding lines of Fig. 15.

The inner member may be integral with or secured to a head member or passaged member 212 (Fig. 19) and providing a lower boss or head 213 (Fig. 15). The member 212 provides a central chamber 214 of sufficient size to receive the tubular member 60 and provides passages 215 and 216 bounded by bridging walls 217 and 218, these passages bridging the annular space between the tubular member 60 and the drill collar 45 to interconnect the window 72 with the faced window 59 to conduct the core particles thereto, the other window 59 being blocked by the tubular member 60. The bridging walls 217 and 218 may be welded to the drive unit 21 around the windows 59 as indicated by the numeral 219.

That portion of the annular space between the tubular member 60 and the drill collar 45 not occupied by the passaged member 212 is formed by the latter and its head 213 into two mud passages 220 which conduct the mud past the window zone and into an annular space 221, corresponding to the annular space 92 previously described. However, in this embodiment, the annular space 221 is formed around a tube 222 having an upper end threaded or otherwise connected at 223 to the head 213 to depend therefrom. The lower end of the tube 222 telescopes with a portion of the bit 20, as by telescoping into a sleeve 224 of the bit, being removably sealed thereto by sealing rings 225 carried in relatively deep annular pockets of the sleeve. The tube 222 loosely surrounds the core-receiving tubular member 60 and depends in a socket 227 of the bit. No seal at this point is required as the junction is sealed from the high pressure mud by the sealing rings 225.

The high pressure mud is sealed from the windows 59 both by the passaged member 212 and by a sealing means 230 which, in this embodiment, may be exclusively above the window zone. The sealing means 230 is shown as including a relatively massive tapered resilient sealing member 231 secured to the core-withdrawing unit and compressing against a seat 232 when the cam follower 210 is seated. The seal 232 may be formed as a tapered wall of a projection 233 secured to or integral with the passaged member 212. The mud passages 220 open on the seat 232 above the sealing member 231, as best shown in Fig. 8, and may be traversed by webs 235 of the seat-forming projection 233 for strength and for guiding the lowermost end of the tubular member 60 into the central chamber 214 of the projection as the core-withdrawing unit 25 is being lowered.

The remainder of the structure in the embodiment of Figs. 15–20 is substantially the same as that previously described and certain main elements are indicated by corresponding numerals.

In the operation, this embodiment is usually assembled as shown and lowered to deepen the hole, the core rising in the core passage 62 and being maximized in length by subdivision of its upper portion adjacent the window level. When it is desired to remove a core section, a sand line or other lifting element is lowered to lock with the engaging means 76 whereupon raising of the lifting element will swing the latch 83 into disengaged position to permit the entire core-withdrawing unit 25 to be raised to the surface of the ground. During later lowering of this core-withdrawing unit, by gravity or fluid pressure or on a sand line, the beveled lower end of the core-receiving tubular member 60 will be guided by contact with the cam surfaces, the seat 232 and/or the webs 235 into the central chamber 214 and centrally into the tube 222, whence the tube 222 will guide it accurately into the socket 227 of the bit. While the lower end is being guided by the tube 222, the follower 210 will engage the cam surfaces 202, 204 or 201, 205 which will turn the core-withdrawing unit 25 into one of the two window-aligning positions during continued lowering of the unit. During the last increment of lowering movement, the sealing member 231 is pressed against the seat 232 and the latch 83 will become engaged to lock the unit. After starting the flow of high-pressure drilling mud through the passages 220 and the annular space 221 to the bit, drilling can be resumed.

Various changes and modifications may be made without departing from the spirit of the invention and certain of these changes and modifications will be apparent to those skilled in the art from the herein-presented description of exemplary embodiments.

I claim as my invention:

1. A coring structure adapted to drive a bit having cutter means for drilling into the earth in an annular zone to leave a core portion which enters a central passage of the bit, said coring structure including: a tubular drive unit for said bit and providing a sidewardly-facing window at a level a considerable distance above said bit; a core-withdrawing unit having upper and lower ends and comprising a tubular member of an internal diameter to receive said core portion, said tubular member having a sidewardly-facing window at said level when said lower end is adjacent said bit to receive said core portion, said tubular member having an external diameter less than the internal diameter of said tubular drive unit to be axially insertable and withdrawable therefrom; and guide means comprising interengaging means on said units for turning said tubular member during its insertion into said drive unit to bring its window into alignment with said window of said drive unit.

2. A coring structure as defined in claim 1, in which said upper end of said core-withdrawing unit is substantially above said window of said tubular member and in which said interengaging means of said guide means are disposed to engage at a position between said upper end and said window of said tubular drive unit.

3. A coring structure as defined in claim 2, in which said interengaging means includes interengageable guide elements respectively carried by said units and in which the axial distance between said lower end of said core-withdrawing unit and said window of said tubular member is greater than the maximum axial distance between the window of said drive unit and the most removed portion of the guide element carried thereby so that said lower end of said core-withdrawing unit is lowered to a position below said window of said drive unit before said guide elements engage each other to orient said windows.

4. A coring structure as defined in claim 1, in which said guide means comprises a cam means on one of said units and a cam follower on the other of said units engageable with said cam means to turn said tubular member during its insertion into said tubular drive unit.

5. A coring structure as defined in claim 1, in which said guide means comprises a cam means on said tubular drive unit and exposed to the interior thereof and a cam follower on said core-withdrawing unit engageable with said cam means to turn said core-withdrawing unit during its insertion into said tubular drive unit.

6. A coring structure as defined in claim 5, in which said cam means has an upwardly-exposed substantially helical cam surface engageable by said cam follower during lowering of said core-withdrawing unit to turn the latter to bring said windows into alignment.

7. A coring structure as defined in claim 6, in which said cam means comprises an inner member secured within said tubular drive unit and providing said cam surface.

8. A coring structure as defined in claim 6, in which said cam means provides a second upwardly-exposed substantially helical cam surface diverging axially relative to said first-named cam surface, said cam surfaces being respectively engageable by said cam follower to turn said core-withdrawing unit during its insertion.

9. A coring structure as defined in claim 1, in which said tubular member provides a closure adjacent and facing its window, said closure providing a sloping surface engageable by said core portion to subdivide same into core masses, said sloping surface guiding said masses through aligned windows.

10. A coring structure as defined in claim 1, in which said tubular drive unit is substantially larger in internal diameter than the external diameter of said core-withdrawing unit to provide therebetween a mud-conducting passage adapted to conduct mud to said bit under high pressure, and including sealing means between said units for sealing said annular space from the space bounded by the aligned windows.

11. A coring structure as defined in claim 10, in which said sealing means comprises a sealing surface on one of said units and a compressible sealing member on the other of said units positioned to engage said sealing surface.

12. A coring structure as defined in claim 10, in which said sealing surface and said sealing member surround said space defined by said aligned windows.

13. A coring structure as defined in claim 1, in which said tubular drive unit is substantially larger in internal diameter than the external diameter of said core-withdrawing unit to provide therebetween a mud-conducting passage, a centering member extending from a position above said aligned windows to a position below said aligned windows, said centering member providing a side portion disposed between said windows and having a third window through which said window of said core-withdrawing unit communicates with said window of said tubular drive unit, said centering member providing a passage means communicating with said annular space to conduct said mud through said centering member and toward said bit.

14. A coring structure as defined in claim 13, in which said sealing means extends around said core-withdrawing unit to seal same relative to said centering member.

15. A coring structure as defined in claim 1, including means for locking said units together with said windows in radial alignment, and means for unlocking said units to permit withdrawal of said core-withdrawing unit from said tubular drive unit.

16. A coring structure as defined in claim 1 adapted for use with a lowerable lifting element and in which said tubular member provides engaging means at its upper end to be engaged by said lifting element to lift said tubular member and said core portion therein from said drive unit while said bit remains attached to said drive unit and in the lower end of the drilled bore.

HOWARD A. TAYLOR.

REFERENCES CITED

The following references are of record in the file of this patent:

UNITED STATES PATENTS

| Number | Name | Date |
| --- | --- | --- |
| 1,785,120 | Harding | Dec. 16, 1930 |
| 1,785,405 | Candee et al. | Dec. 16, 1930 |
| 1,867,024 | Oliver | July 12, 1932 |
| 2,138,006 | Howard | Nov. 29, 1938 |
| 2,514,585 | Natland | July 11, 1950 |